July 8, 1930.  D. P. OWENS  1,770,322
ODOMETER FOR TESTING VEHICLE BRAKES
Filed Nov. 1, 1927
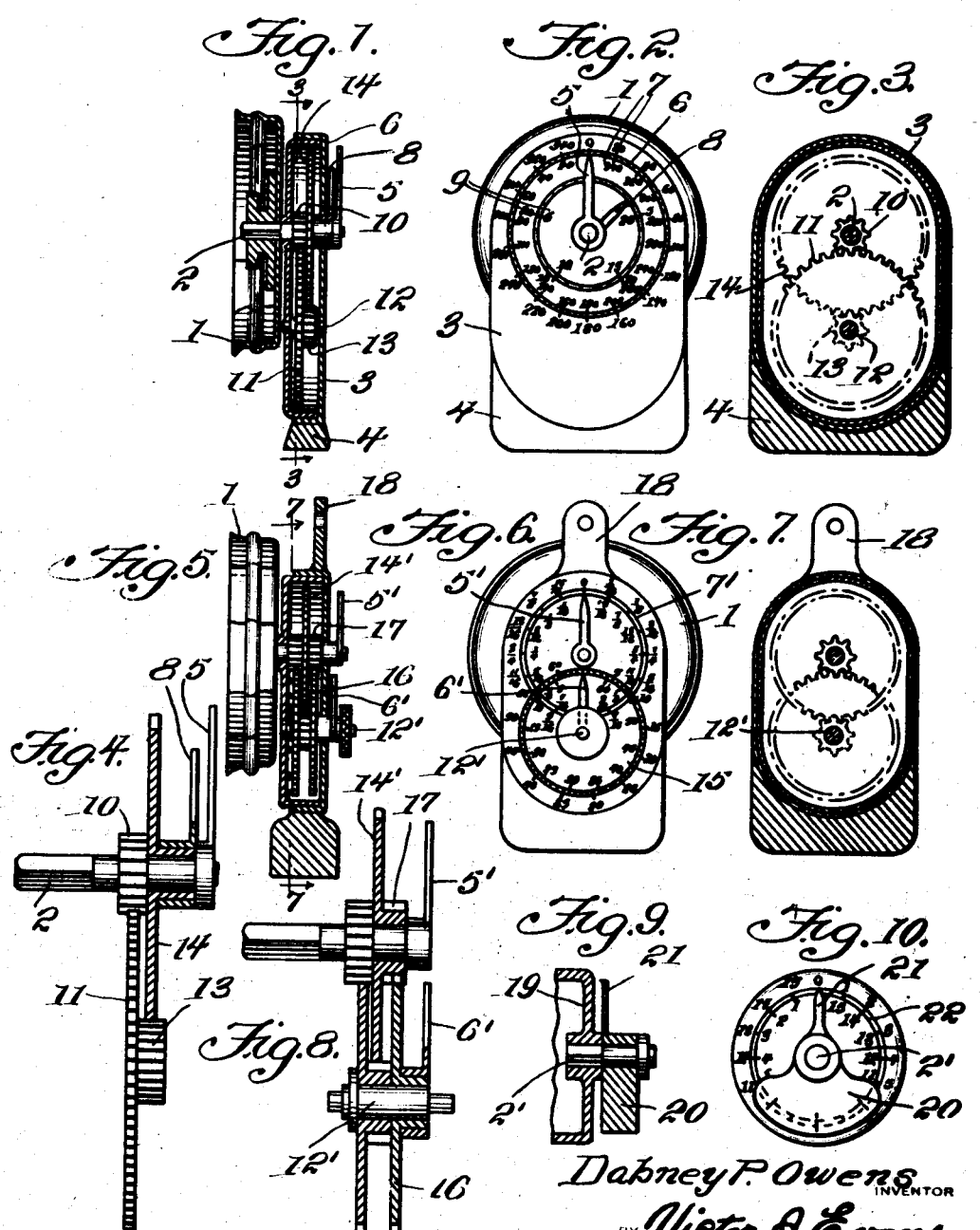

Patented July 8, 1930

1,770,322

UNITED STATES PATENT OFFICE

DABNEY P. OWENS, OF LAKE WORTH, FLORIDA

ODOMETER FOR TESTING VEHICLE BRAKES

Application filed November 1, 1927. Serial No. 230,305.

This invention relates to means for facilitating the adjustment of brakes of vehicles and the like, the general object of the invention being to provide devices for registering the revolutions of the brake carrying wheels of the vehicle, with means for attaching each device to a wheel.

Another object of the invention is to provide each device with a shaft fastened to a cap which is adapted to be attached to the hub cap of a vehicle, the shaft having a finger thereon which cooperates with a dial for indicating the fractions of a revolution made by the wheel, with a second finger and dial, actuated by gearing from the shaft, for indicating the number of revolutions made by the wheel.

Another object of the invention is to provide a device which simply registers the revolutions made by the wheel up to a certain number.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view showing one form of the invention.

Figure 2 is a front view of Figure 1.

Figure 3 is a section on line 3—3 of Figure 1.

Figure 4 is an enlarged sectional view showing the gearing.

Figure 5 is a view partly in section showing another modification.

Figure 6 is a face view of Figure 5.

Figure 7 is a section on line 7—7 of Figure 5.

Figure 8 is an enlarged sectional view showing the gearing of the modification.

Figure 9 is a sectional view of another modification.

Figure 10 is a front view of this modification.

Referring to Figures 1, 2, 3 and 4, 1 indicates the cap which is adapted to be detachably fastened to the hub cap of a vehicle, as fully described and illustrated in an application filed November 1, 1927, Serial No. 230,303. This cap carries a stub shaft 2 and a weighted casing 3 is journaled on said shaft with the front end of the shaft projecting from the casing. This casing remains stationary while the shaft rotates, due to the weight 4 and a finger 5 is fastened to the outer end of the shaft which cooperates with a dial 6 on the face of the casing. This dial is formed with a double row of graduations 7, the graduations of one row being reversely arranged to those of the other so that the position of the finger can be read from the dial whether the finger moves in one direction or the other. This finger and its graduations will indicate the fractions of a revolution made by the shaft. A second finger 8 is rotatably mounted on the shaft and cooperates with an annular row of graduations 9 on the dial for indicating the number of complete revolutions made by the shaft up to a certain number, when the finger will start again to travel around the dial. This finger is driven from the shaft by a number of reducing gears so that it travels much slower than the shaft. The reducing gears comprise a pinion 10 fastened on the shaft and meshing with a gear 11 on the shaft 12 carried by the casing, a pinion 13 fastened to the gear 11 and meshing with a gear 14 rotatably mounted on the shaft 2 and to which is fastened the finger 8. I prefer to so arrange the parts that the finger 5 will make one complete revolution while the finger 8 is making 1/25 of a revolution, the graduations on the dial being arranged in accordance with these movements of the fingers.

From the foregoing it will be seen that the finger 8 and its graduations will register the complete revolutions made by the wheel of a vehicle up to a certain number, while the finger 5 and its graduations will register the fractional parts of a revolution. Thus by placing these devices on the hub caps of the brake carrying wheels of a vehicle, their revolutions can be counted so that one can easily ascertain whether or not the brakes have been properly adjusted. The manner of using devices of this nature in connection with the adjustment of the brakes of a vehicle is fully described in the above mentioned application.

Figures 5, 6, 7 and 8 show a modification in which the finger 6' is arranged on the shaft 12' and the dial 15 for said finger 6' is arranged partly below the dial 7' for the finger 5'. In this case, a gear 16 carried by shaft 12' meshes with a pinion 17 on the gear 14' and the finger 6' is fastened to the gear 16. Thus the finger 6' rotates at a very much reduced speed with respect to the finger 5'. I prefer to so arrange the parts that the finger 5' will make one complete revolution while the finger 6' is making 1/64 of a revolution. The dial 7' and the finger 5' register the fractional parts of a revolution while the finger 6' and its dial registers the complete revolution. The casing may be provided with a perforated ear 18 at its top for receiving means for fastening the casing to a part of a vehicle.

Figures 9 and 10 show a simple form of the invention in which the shaft 2' is fastened to a cap member 19 which may be the hub cap itself or another part which is fastened to the cap. A weight 20 is rotatably mounted on the shaft and a finger 21 is formed on the upper part of the weight and cooperates with a double row of graduations 22 on the face of the member 19 for indicating the number of revolutions made by the vehicle wheel. As will be seen, the weight and finger remain stationary as the other parts rotate and thus the finger will point to a number on the dial which will represent the number of revolutions made by the wheel when the vehicle is stopped. I also arrange these graduations in reverse order so that the device can be placed on either a right hand wheel or a left hand wheel.

The graduations may be arranged in various ways. For example, they may represent degrees of a circle as shown in the outer row of graduations in Figure 2, or they may simply indicate the number of revolutions and fractions thereof, as indicated in Figure 6.

It is thought from the foregoing description that the advantages and novel features of my invention will be readily apparent.

It is to be understood that I may make changes in the construction and in the combination and arrangement of the several parts, provided that such changes fall within the scope of the appended claim.

What I claim is:—

An odometer comprising a cap adapted to be fastened to a rotary member, said cap having an enlargement at its center, a shaft passing through the center of the cap and fastened to the enlargement, a casing through which the shaft passes, said casing being rotatably mounted on the shaft, a weight on the lower end of the casing for holding the same stationary during the rotary movement of the shaft, a finger on the outer end of the shaft, a dial on the casing over which the finger passes during the rotary movement of the shaft, a second finger rotatably mounted on the shaft, gearing connecting the shaft with the second finger whereby said second finger will move at less speed than the first finger and a dial on the casing associated with said second finger.

In testimony whereof I affix my signature.

DABNEY P. OWENS.